United States Patent [19]

Hirmann

[11] 3,963,386

[45] June 15, 1976

[54] ROTARY MOTOR WITH INFLATABLE EXPANSION MEMBER

[75] Inventor: Georg Hirmann, Zurich, Switzerland

[73] Assignee: Inventa AG, Zurich, Switzerland

[22] Filed: Sept. 9, 1974

[21] Appl. No.: 504,108

[30] Foreign Application Priority Data

Nov. 9, 1973 Switzerland 15781/73

[52] U.S. Cl. 418/45; 418/153; 92/39; 92/92

[51] Int. Cl.$^2$ F01C 5/00; F01B 19/00; F16J 3/00

[58] Field of Search 418/45, 152, 153, 195; 417/474–476; 92/39, 64, 91, 92

[56] References Cited

UNITED STATES PATENTS

| | | | |
|---|---|---|---|
| 1,347,512 | 7/1920 | Kirby | 418/153 |
| 2,346,236 | 4/1944 | Rose et al. | 418/45 |
| 2,582,413 | 1/1952 | Clark | 418/153 |
| 3,014,348 | 12/1961 | Mauch | 91/472 |

FOREIGN PATENTS OR APPLICATIONS

| | | | |
|---|---|---|---|
| 891,724 | 12/1943 | France | 418/195 |
| 365,626 | 12/1938 | Italy | 417/474 |
| 453,807 | 9/1936 | United Kingdom | 417/474 |
| 122,517 | 1/1919 | United Kingdom | 418/195 |

*Primary Examiner*—John J. Vrablik
*Attorney, Agent, or Firm*—Finnegan, Henderson, Farabow & Garrett

[57] ABSTRACT

A fluid pressure motor having a plurality of independent, freely distortable pressure chambers connected together in the form of a multi-lobed rosette shaped structure arranged between two rotatable supporting plates inclined at an angle to each other. The chambers are elastically deformable by the fluid pressure and there are at least two rosette shaped structures superimposed between the rotating support plates with adjacent chambers in each of the rosettes being in fluid communication with each other and with a control system for introducing a fluid pressure medium into the chambers sequentially and expelling it after the chambers have attained maximum volume.

4 Claims, 7 Drawing Figures

ROTARY MOTOR WITH INFLATABLE EXPANSION MEMBER

A so-called churning cell motor serves to produce a movement, e.g. of swinging or rotation, through the use of a liquid or gaseous pressure fluid. In one embodiment constructed as a so-called axial motor, expansion chambers consisting at least in part of material which can be elastically deformed by the pressure fluid are arranged between two supporting surfaces which are mounted on axial shafts set at an angle to each other, the expansion chambers being provided in a plurality of superimposed multi-lobed rosette shaped structures, each rosette being divided into a plurality of individual and freely distortable inflatable cells that form the expansion chambers and a control system is provided for the expansion chambers so that pressure fluid is supplied to them in their operational sequence and discharged from them when they reach their maximum volume. The expansion chambers of such radial or axial churning cell motors consist of freely deformable churning cells which have at least part of their edges exposed. Each churning cell must be secured to at least one of the supporting surfaces.

BRIEF DESCRIPTION OF THE DRAWING

The invention will now be described with reference to the figures which illustrate the invention purely diagrammatically and by way of example.

DETAILED DESCRIPTION

Figures 1, 2:
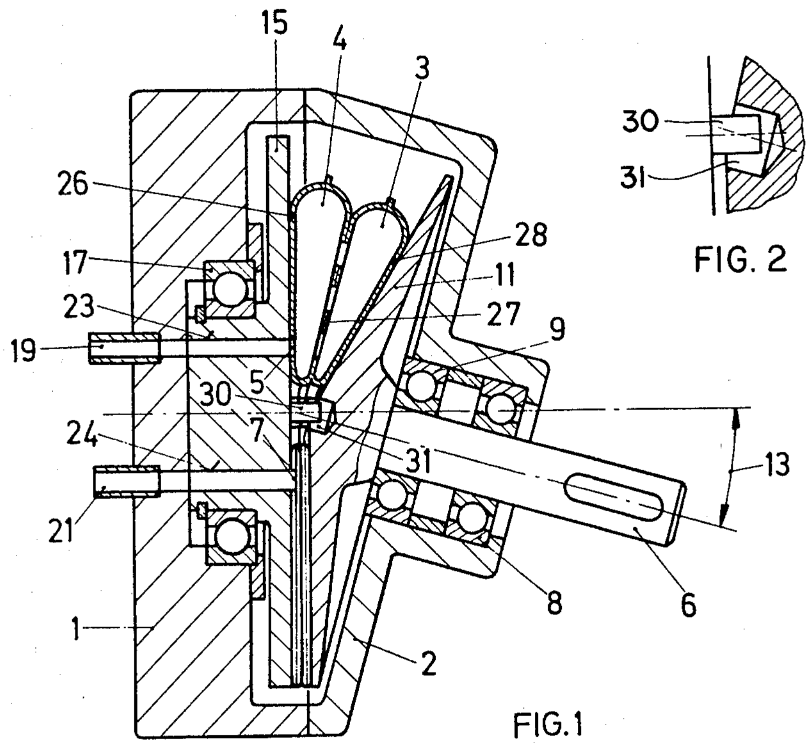
FIG. 1 is an axial section through an axial motor operated by churning cells.
FIG. 2 is an enlargement of the centering pin shown in FIG. 1.

FIG. 1 is an axial section through a pressure gas motor in a motor housing consisting of two parts 1 and 2 screwed together. The section also shows two superimposed rosettes 3, 4 such as those, for example, illustrated in FIG. 3 or 4. One churning cell of each of the two rosettes 3 and 4 is shown in the inflated state in which it gives off energy while the other cells, of which there are at least two in number, are shown in the deflated or inoperative state. The housing part 2 also contains a motor drive shaft 6 mounted in two ball bearings 8 and 9. On the internal end of this shaft 6 is a supporting disc 11 the axis of which is set at an angle to that of a second supporting disc 15. The angle 13 between the two axes is fixed. The supporting disc 15 is mounted in a ball bearing 17 in the housing part 1. Housing part 1 also has a pressure pipe connection 19 through which the operating fluid is supplied and a discharge pipe connection 21 through which the fluid is discharged. Extending through the supporting disc 15 are two bores 23 and 24 which lead to apertures 5 and 7, respectively, in the corresponding churning cells of the two rosettes 3 and 4. The corresponding superimposed churning cells are also connected together at their center, preferably through unequal apertures to ensure that although they form one driving unit each one will be individually inflated when pressure fluid is introduced (to prevent the cell walls sticking together). The rosettes are connected together by a layer of adhesive 27 between pairs of adjacent churning cells and rosette 4 is connected to supporting disc 15 by means of a layer of adhesive 26. Gluing the cells to only one of the discs, 11, 15 is essential if no positive connection is provided between the two discs. In the embodiment illustrated, the rosettes 3 and 4 are held radially to the supporting disc 15 by a centering pin 30 which engages in a centering recess 31 in the drive shaft 6 of the motor, as shown in the enlargement of FIG. 1*a*. The rosettes 3 and 4 are perforated at the center and are mounted on the pin 30.

The rosettes 3 and 4 can be fixed together and to supporting disc 15 by means of a layer of adhesive applied directly, e.g. by spraying, along lines as discussed below in connection with FIGS. 3 and 4. A pressure-sensitive adhesive or a doublesided adhesive tape may be used if desired. This method of fixing the rosettes to the driven supporting disc 15 is extremely simple. It allows the contact surfaces both of the supporting disc and of the rosette to be finished in a very simple manner. Moreover, it imposes no restrictions on the shape of the rosettes or of the cross-section and external form of the inlet and outlet. In addition, it allows for rapid and easy replacement of the rosettes if they become defective. Such a method of connecting rosettes and supporting surfaces also allows for better utilization of the volume and a more compact construction.

For the operation of the motor it is extremely important to be able to achieve firm adherence of the foil of the rosettes because improved positive connection between the two supporting discs can then be obtained without any additional measures.

This connection between two superimposed rosettes or churning cells also has the advantage of shortening the stretching area of the foils, which in turn has a very advantageous effect on the life of the foils or of the rosettes which normally consist of two foils stuck together. It is then also possible to have a larger angle of inclination between the supporting discs by combining two or more superimposed rosettes without thereby putting an excessive strain on the churning cells, and consequently the efficiency of the motor can be substantially increased with virtually no increase in size.

Figure 3:
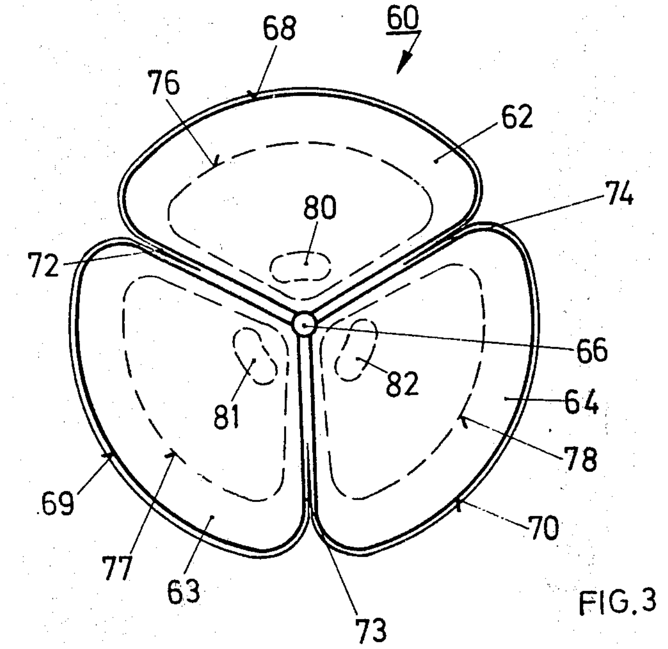
FIG. 3 is a top plan view of a three-part rosette of the present invention showing the connecting surfaces and slit-shaped inlet and outlet apertures.

FIG. 3 shows a rosette 60 consisting of three churning cells 62, 63, 64. These rosettes may have an odd or even number of cells. These churning cells 62, 63, 64 are independent of each other and connected together only in the central part 66. Their external outlines are in the form of circular arcs 68, 69, 70 and they are separated from each other by gaps 72, 73, 74 which preferably extend inwards up to R/2.

This separation allows for trouble-free operation of each cell undisturbed by its neighboring cells.

In FIG. 3 the contours of the connecting surfaces are indicated by the reference numerals 76, 77, and 78. These surfaces are either selfadherent or covered with a layer of adhesive or applied with adhesive tape. FIG. 3 also shows the apertures 80, 81 and 82 opening into the interior of the cells. In this example the apertures are slots in the form of sectors.

Figure 4:
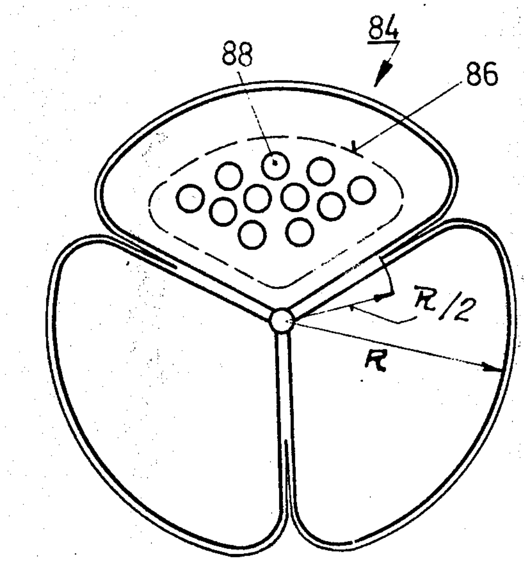
FIG. 4 shows a rosette analogous to that of FIG. 3 with a plurality of circular inlet and outlet apertures.
Figure 5:
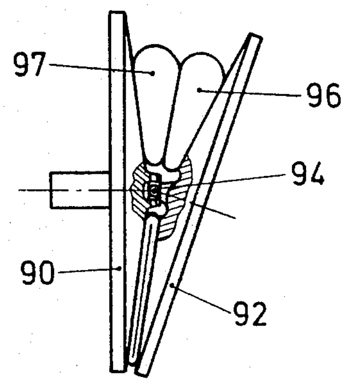
Figure 6:
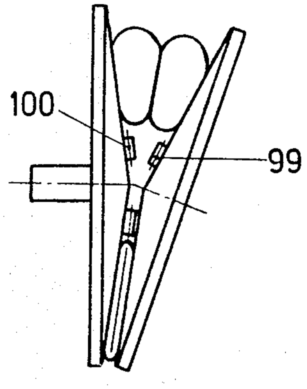
Figure 7:
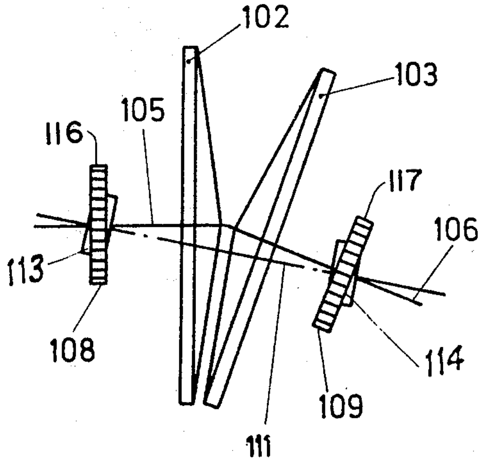

A similar rosette 84 is shown in FIG. 4. It has basically the same structures as that of FIG. 3, i.e. it is also composed of three churning cells. The contour of the adhesive surface 86 is shown in one of the cells. Instead of the slit-like aperture, a plurality of circular apertures 88 are provided in this example. This provides a larger inlet and outlet cross-sectional area without noticeably weakening the structure of the foil.

The motor partly illustrated in FIG. 1 operates as follows:

The operating fluid under pressure enters the housing part 1 through the pressure pipe connection 19 (FIG. 1). When the bore 23 of the supporting disc 15 is in alignment with connection 19, the fluid enters the churning cells of rosettes 4 and 3 through their apertures 5 to inflate the cells (with the aid of the apertures of unequal size in the cells) and consequently exerts pressure on the contact surfaces of the supporting discs 15 and 11. The resultant of these forces does not intersect the axes of rotation of the supporting discs 11 and 15 and consequently a torque is exerted on the supporting discs, which sets them in rotation. The resulting torque is dependent upon the angle of inclination, i.e. the angle 13 between the two supporting discs 11 and 15 or the angle between the two axes of rotation of the supporting discs 11 and 15. The torque increases with increasing angle between the two discs 11 and 15. Due to the rotation of the discs, the bore 23 of the supporting disc 15 is disconnected from the pressure pipe connection 19 and connected with the bore 24 leading to the discharge pipe connection 21 so that the contiguous surfaces of the supporting discs 11 and 15 squeeze the two superimposed cells between them and expel the operating fluid through the pipe connection 21.

The inflow and discharge apertures in housing part 1 leading to connections 19 and 21 are associated with the supporting disc 15 over an angular range of the order of about 150°so that any motor which has more than two cells can easily start in any position since at least one of the cells is always supplied with pressure fluid and can therefore produce a torque.

It will be obvious to those skilled in the art that various changes may be made without departing from the scope of the invention and the invention is not to be considered limited to what is shown in the drawings and described in the specification.

What is claimed is:

1. A motor actuated by a fluid pressure medium comprising a housing; a rotatable output drive shaft; a first support plate rotatably mounted in said housing having a supporting surface and a first axis of rotation; a second support plate having a substantially conical supporting surface and being rotatably mounted in said housing about a second axis of rotation, said first and second support plate axes being inclined at an intersecting angle and not mechanically connected to each other, said second support plate being connected to the output shaft to cause rotation thereof upon movement of said second support plate; a plurality of multi-lobed rosette shaped structures arranged between the first and second support plates, each rosette structure being divided into a plurality of independent freely distortable expansion chambers, said rosette structures being connected together and only to said first support plate in superimposed relationship between the plates; the rosette structure adjacent to the first plate being connected thereto over a relatively small area compared to the total surface area of the support plate; means providing fluid communication between adjacent chambers of the superimposed rosette structures; and pressure control means for admitting said fuid pressure medium into each expansion chamber of the rosette adjacent the first plate and the adjacent chambers of the superimposed rosettes in fluid communciation therewith sequentially to cause movement of the second support plate and rotation of the output shaft, said pressure control means permitting said fluid pressure medium to be expelled from all communicating expansion chambers simultaneously after the maximum volume of the chambers has been attained.

2. The motor according to claim 1, wherein the rosette structure adjacent the first support surface is connected thereto with an adhesive.

3. The motor according to claim 1, wherein adjacent rosette structures are adhesively bonded together.

4. The motor according to claim 1, wherein a radially extending slit extends from outside inwards to a depth of at least half the radius of each rosette between each of the plurality of chambers in the rosette.

* * * * *